Feb. 7, 1939.　　　　A. L. NILSSON　　　　2,145,948
BROACHING MACHINE
Filed Jan. 30, 1937　　　2 Sheets-Sheet 1
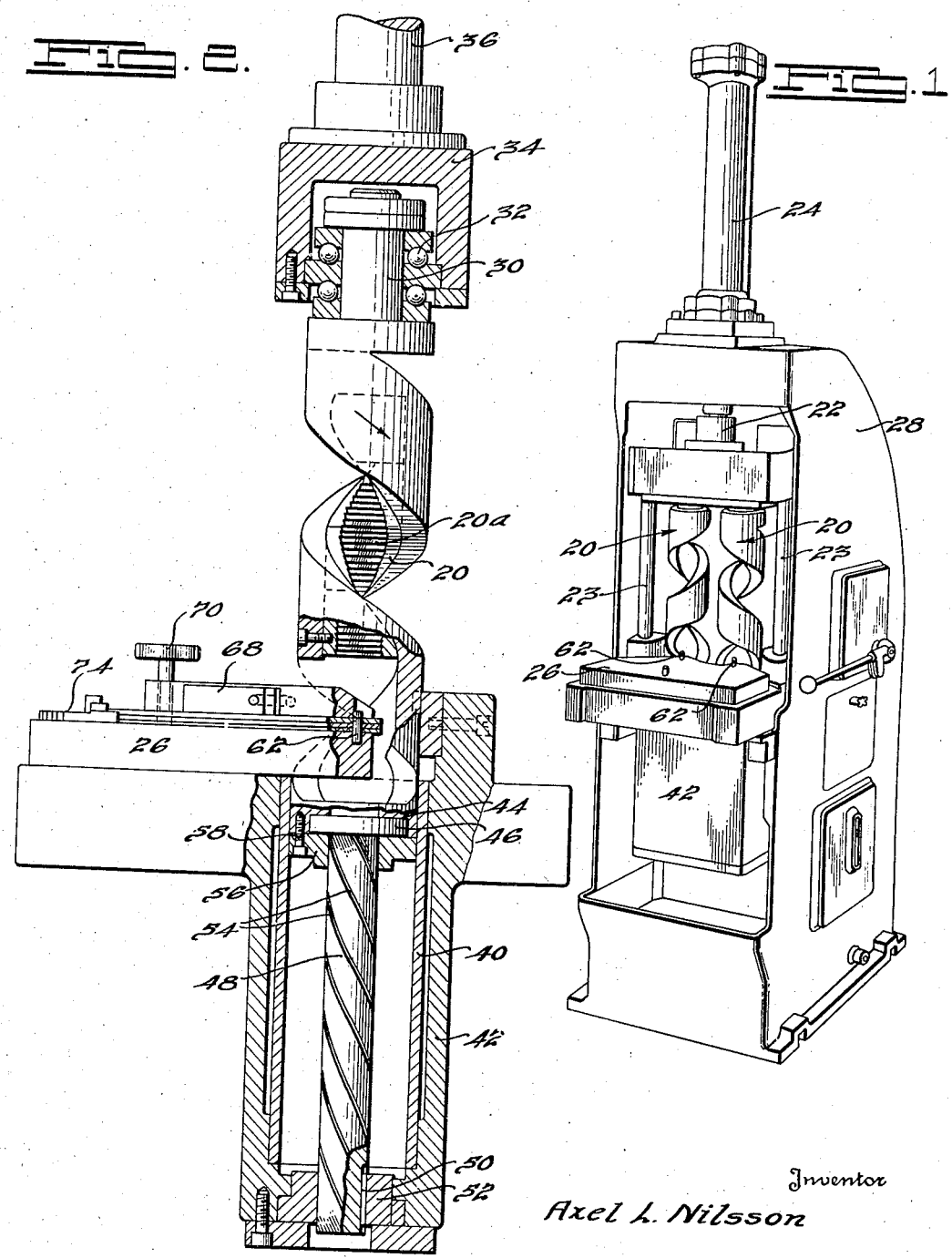
Inventor
Axel L. Nilsson Feb. 7, 1939.　　　A. L. NILSSON　　　2,145,948
BROACHING MACHINE
Filed Jan. 30, 1937　　　2 Sheets-Sheet 2
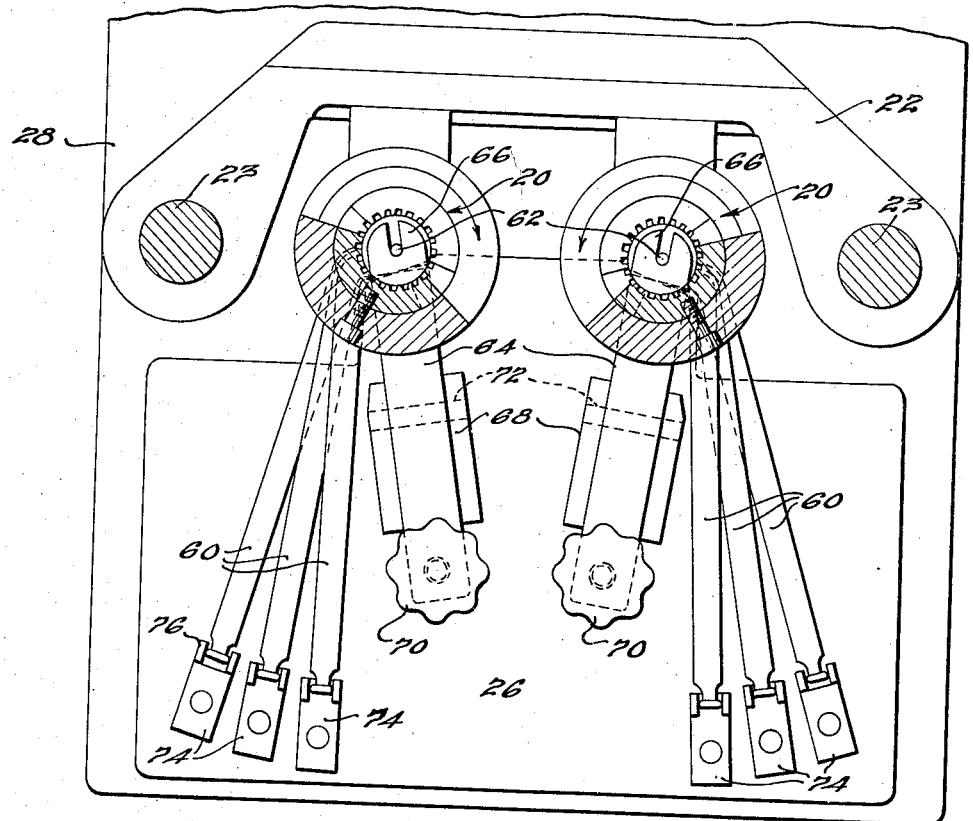
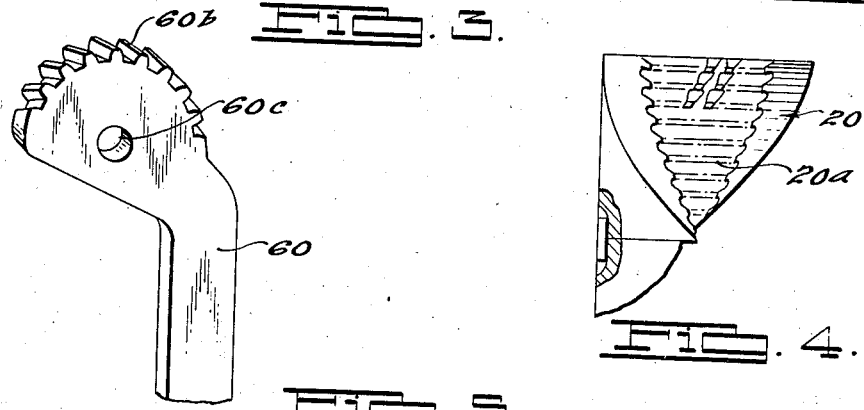
Inventor
Axel L. Nilsson
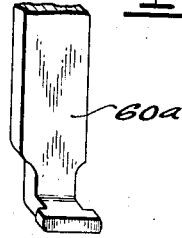
Attorneys.

UNITED STATES PATENT OFFICE 2,145,948

BROACHING MACHINE

Axel L. Nilsson, Pleasant Ridge, Mich., assignor to Colonial Broach Company, Detroit, Mich., a corporation of Michigan Application January 30, 1937, Serial No. 123,169

12 Claims. (Cl. 90—33)

The present invention relates to broaching machines, and in particular provides an improved broaching machine for forming one or more helical serrations on the surface of a work piece.

It has heretofore been proposed to utilize broaches and broaching machines to form helical serrations on the outer periphery of a work piece to form, for example, external helical gears or gear segments. Conventionally, a closed broach body is utilized, having inner helically disposed teeth around all or a portion of the inner periphery thereof, depending upon whether the serrations or teeth are to extend entirely around the periphery of the work piece or around only a predetermined segment or portion thereof. Alternatively, and in accordance with the improvements proposed in the co-pending application of William A. Hart, Serial No. 111,000, filed November 16, 1936 and assigned to the assignee of the present application, the broach is formed as a plurality of segments, each of which segments is effective to form the serrations or teeth in a predetermined portion of the periphery of the work piece. The respective segments are preferably disposed in axially disposed relation, in order to afford free access to the interior of the broach for chip clearance and the like. The axial movement of the work piece relative to the broach is accompanied by a relative rotation between the members, the degree of which corresponds to the desired helix angle of the serrations or teeth.

As will be appreciated, the heretofore proposed method of broaching helical serrations on the external periphery of a work piece are practical only in connection with work pieces which can be passed axially through the broach body; that is, work pieces having an external periphery which adapts them to be bodily passed through the broach. This limitation has prevented the extension of broaching to the manufacture of devices such as a crank arm having a helical gear segment formed at one end thereof.

In accordance with the present invention, the just mentioned limitation is entirely overcome, and the field for broaching correspondingly widened, by forming the broach body in the form of an open helix, the angle of which corresponds to the desired helix angle of the broach teeth and positioning the broach teeth on the inner surface of this open helix. With this arrangement, the open helix of the broach accommodates the projecting part of the work piece, such as the arm of the just mentioned crank, and permits the toothed portion of the work piece to be serrated or provided with helical teeth to be readily presented to the broach teeth. The broaching operation may thus consist in moving the work piece axially of the broach and in relatively rotating the work piece and broach about the axis of the broach. Claims to the improved broach are presented in applicant's co-pending application, Serial No. 123,168, filed January 30, 1937, and assigned to the same assignee as the present application, and the present application is directed particularly to the improved broaching machine.

With the foregoing considerations in mind, objects of the present invention are to provide an improved machine for broaching external helical gear elements, utilizing a broaching tool formed as an open helix and having helically disposed broaching teeth on the inner surface thereof, and utilizing means to effect axial linear movement and angular rotation of the broach relative to a work piece; to provide such a machine utilizing a broach draw head for effecting the axial linear movement of the broach relative to the work piece, and utilizing a master lead screw for effecting the axial rotation of the broach relative to the work piece, the lead screw being adapted to telescopically enter the broach body; to provide such a machine utilizing relatively stationary work supporting mechanism, adapted to support the work so that it projects into the broach through the open helix of the latter to present the surface to be broached to the broach teeth; to provide such a machine in which a plurality of work pieces to be provided with one or more helically disposed serrations, may be supported in superposed and angularly offset relation; and to provide such a machine utilizing a plurality of broaches, certain of which are adapted to form left-handed helical serrations in work pieces and others of which are adapted to form right-handed serrations in work pieces.

Other generic as well as more detailed objects of the present invention appear in the following description and in the appended claims. In the drawings, which illustrate a preferred but illustrative embodiment of the invention, and throughout which corresponding reference characters are used to designate corresponding parts:

Figure 1 is a perspective view in front elevation of a machine embodying the present invention;

Fig. 2 is a fragmentary view with certain of the parts broken away, showing the relation of the improved broach and work supporting mechanism of the machine of Fig. 1;

Fig. 3 is a top plan view showing additional details of the work holding mechanism of the machine of Fig. 1;

Fig. 4 is a fragmentary detailed view showing details of the broach structure; and Fig. 5 is a perspective view of an illustrative work piece which may be broached in the practice of the invention.

Referring to the drawings, the machine is illustrated as of the vertical push type, designed to accommodate two helically formed broaches 20, which are adapted to be moved downwardly as viewed in Figs. 1 and 2 under the influence of a cross-head 22, which is actuated by the piston (not shown) of suitable hydraulic ram mechanism 24. The cross-head 22 is suitably guided by columns 23. The broaches 20 are shown in their upper positions, and a downward movement thereof as effected by the ram mechanism 24 causes them to move past the stationary work table 26 which projects from the front of the frame 28 of the machine.

As described in detail in applicant's above identified co-pending application, Serial No. 123,168, each of the broaches 20 is formed as an open helix, of a lead corresponding to the lead of the helical serrations of the teeth which it is desired to produce upon the work pieces and having correspondingly helixed broach teeth disposed on the inner surface thereof. The teeth 20a of each broach 20, which increase in height from the lower end of the broach as viewed in Fig. 2 to the upper end thereof, are disposed on a helix angle corresponding to the helix angle to be produced in the work piece, and to which helix angle the general open helix of the broach as a whole, of course, corresponds.

The upper end of each broach 20 is formed as a trunnion 30 which is rotatably journaled between ball thrust bearings 32 with a broach head 34. The shank 36 of each head 34 may be connected to the previously mentioned cross-head 22 in any suitable way, so that downward movement of the cross-head 22 causes a corresponding downward movement of each broach 20, while at the same time permitting axial rotation of the broach 20.

Each broach 20 is guided within a cylindrical sleeve 40, suitably supported within the main frame portion 42 and the lower end of the broach is provided with a counter-bore 44, which rotatably receives a head 46 which is secured to the upper end of a master lead screw 48. The lower end of the lead screw 48 is keyed as by a key 50 to a collar 52, suitably secured to the underside of the just mentioned frame portion 42. The lead screw 48 is provided with a single or multiple helical groove 54 and a driving collar 56 is provided with similarly formed helical tongues which enter the grooves 54, in order to provide a rotative driving connection between the broach 20 and the lead screw 48. The collar 56 is secured to the lower end of the broach 20 by one or more studs 58. With this arrangement, as will be appreciated, a downward movement of the broach 20 causes the driving collar 56 to rotate about the lead screw 48, as determined by the lead of the screws 54, and this rotation causes a corresponding axial rotation of the broach 20. It will be appreciated that the leads of the broach teeth 20a and of the screw 48 correspond to each other.

Referring particularly to Fig. 5, it will be appreciated that the improved broaching machine of the present invention may be practiced in broaching helical serrations or teeth in work pieces of a wide variety of forms, characterized generally as having a shape or size which prevents their being passed through a body of a conventional enclosed circular or ring broach. The work piece 60 shown specifically in Fig. 5 as well as generally in the other figures, represents a portion of the window regulating mechanism of a vehicle, and includes a shank or crank portion 60a and a segmental tooth portion having helically disposed teeth 60b having a bearing opening 60c concentric therewith.

As shown in Figs. 2 and 3, in order to permit a plurality of work pieces to be broached during each pass of each broach 20, they are disposed upon the work table 26 in superposed but angularly offset relation, with the faces thereof in overhanging relation to the table 26. A pin 62 projects upwardly from the work table 26 at the axial center of the associated broach, and also projects through the bores 60c of the work pieces 60. The work pieces 60 are retained in assembled relation to the pin 62 by a clamping bar 64, having a bifurcated end 66, and pivotally supported within a clevis 68 upon the work table 26. A conventional screw mechanism 70 may be provided to rock each clamp 64 about its pivot pin 72, in order to force the bifurcated end 66 thereof down upon the work pieces and clamp them in place. In addition to the just described clamp 64, the work table 26 preferably additionally accommodates a plurality of clips 74, equal in number to the number of work pieces 60, each of which is provided at its forward end with upstanding leg portions 76, which receive the extreme end of the associated work piece.

As clearly appears in Fig. 1, and as indicated by the arrows in Fig. 3, the two broaches 20 are oppositely disposed and are adapted to be rotated in respectively opposite directions, one thereof being adapted to cut left-handed threads in the associated work pieces 60 and the other thereof being adapted to cut right-handed threads in the associated work pieces. The reverse direction of rotation of the broaches may be effected, as will be appreciated, by providing the lead screws 48 individual thereto with slots 54 of respectively opposite leads. The work holding mechanisms for the two broaches 20 may be duplicates of each other as clearly appears in Fig. 3, except that the work pieces 60 are oppositely presented to the broaches.

Considering the operation of the machine as a whole, it will be appreciated that the two broaches 20 normally occupy the illustrated upper positions thereof and that as a preliminary to a broaching operation, a plurality of work pieces 60 to be broached with threads of one hand are stacked upon the pins 62 associated with one of the broaches and that a correspondingly plurality of work pieces to be provided with threads of opposite hand may be stacked upon the pins 62 associated with the other broach. The guide elements 74 facilitate the positioning of the work pieces in proper angularly offset relation to each other and the setting up operation is completed by clamping each of the clamps 64 over the associated pin 62 and down upon the associated work pieces 60.

Thereafter, the two broaches 20 may be caused to move downwardly through a complete stroke, by suitably actuating the ram mechanism 24, during the course of which downward movement the broaches 20 are rotated and, in a single pass thereof are effective to completely cut the helical teeth 60b in all of the work pieces.

Although a specific embodiment of the invention has been shown in detail, it will be appreciated that various modifications in the form, number, and arrangements of parts, may be made within the spirit and scope thereof.

What I claim is:

1. In a machine for broaching one or more helically disposed serrations on the exterior of a work piece, the combination of a broach of open generally helical formation, the successive turns whereof are spaced apart from each other so as to permit the work piece to be laterally admitted to the interior of the broach, said broach having helically disposed broach teeth on the inner surface thereof, means for supporting said work piece so that it extends laterally into the broach with said exterior presented to said broach teeth, and means for effecting linear reciprocation and rotation of said broach and said work piece relative to each other.

2. In a broaching machine for forming one or more helically disposed serrations on an external surface of a work piece, the combination of a broach of open generally helical form, the successive turns whereof are spaced apart from each other so as to permit the work piece to be laterally admitted to the interior of the broach, said broach having broach teeth formed on the inner surface thereof, means for causing linear movement of said broach, means for supporting a work piece so that it extends laterally into the broach with said surface thereof presented to said broach teeth, and means for effecting relative rotation between said work piece and said broach about the axis of said broach during said linear movement of said broach.

3. In a broaching machine for forming one or more helical serrations on an external surface of a work piece, the combination of a broach of open generally helical formation, the successive turns whereof are spaced apart from each other so as to permit the work piece to be laterally admitted to the interior of the broach, said broach having helically disposed broach teeth on the interior surface thereof, means for effecting linear axial movement of said broach and for effecting axial rotation thereof in timed relation to said axial movement, and means for stationarily supporting a work piece so that it extends laterally into the broach with said external surface thereof presented to said broach teeth.

4. In a broaching machine for forming one or more helically disposed serrations on the external surface of a work piece, the combination of a broach of open generally helical formation, the successive turns whereof are spaced apart from each other so as to permit the work piece to be laterally admitted to the interior of the broach, said broach having helically disposed broach teeth on the interior surface thereof, means for effecting linear axial movement of said broach, a lead screw drivingly connected to said broach and adapted to be telescopically received therein during said linear movement for effecting axial rotative movement of said broach during said linear movement, and means for stationarily supporting a work piece so that it extends laterally into the broach with said external surface thereof presented to said broach teeth.

5. In a broaching machine for forming one or more helically disposed serrations on the external surface of a work piece, the combination of a broach of open generally helical form, the successive turns whereof are spaced apart from each other so as to permit the work piece to be laterally admitted to the interior of the broach, said broach having broach teeth on the inner surface thereof, a work table, means for effecting rotative and linearly axial movement between said broach and said work table, and a work holder for supporting a plurality of work pieces in superimposed angularly offset relation so that they extend laterally into the broach with said external surfaces thereof presented to said broach.

6. In a broaching machine for forming one or more helically disposed serrations on the external surface of a work piece, the combination of a broach of open generally helical form, the successive turns whereof are spaced apart from each other so as to permit the work piece to be laterally admitted to the interior of the broach, said broach having broach teeth on the inner surface thereof, a work table, means for effecting rotative and linearly axial movement between said broach and said work table, and means for supporting said work piece with said projecting portion thereof passing through the open portion of said broach and with said external surface thereof presented to said broach teeth.

7. In a broaching machine for forming one or more helically disposed serrations on the external surface of a work piece having a projecting part, the combination of a broach of open generally helical form, the successive turns whereof are spaced apart from each other so as to permit the work piece to be laterally admitted to the interior of the broach, said broach having broach teeth on the inner surface thereof, a work table, means for effecting rotative and linearly axial movement between said broach and said work table, and means for supporting a plurality of said work pieces with said external surfaces thereof in superposed angularly offset cutting relation to said broach teeth, and with the projecting portions thereof projecting outwardly of said broach through the opening in the body thereof.

8. In a broaching machine for forming one or more helically disposed serrations on the external surface of a work piece having a projecting part, the combination of a broach of open generally helical form, the successive turns whereof are spaced apart from each other so as to permit the work piece to be laterally admitted to the interior of the broach, said broach having broach teeth on the inner surface thereof, a work table, means for effecting rotative and linearly axial movement between said broach and said work table, and a work holder for said work piece including said work table, a guide pin projecting from said work table disposed to pass through a bore in said work piece to axially center the same, a clamp disposed to bear upon said work piece, and a guide element for the projecting portion of said work piece.

9. In a machine for broaching one or more helically disposed serrations on a work-piece, the combination of a broach having a body of strip-like form wound in open generally helical formation with the successive turns spaced apart axially and having a plurality of cutting teeth formed thereon, means for supporting said work-piece so as to project laterally towards said broach body with the broach teeth presented to the work-piece surface, and means for effecting linear reciprocation and rotation of said broach and said work-piece relative to each other.

10. In a machine for broaching one or more helically disposed serrations on a work-piece, the combination of a broach having a body of strip-like form wound in open generally helical formation with the successive turns spaced apart axially and having a plurality of cutting teeth formed thereon, means for causing linear movement of said broach, means for supporting a work-piece so that it extends laterally toward the broach with said surface thereof presented to said broach teeth, and means for effecting relative rotation between said work-piece and said broach about the axis of said broach during said linear movement of said broach.

11. In a machine for broaching one or more helically disposed serrations on a work-piece, the combination of a broach having a body of strip-like form wound in open generally helical formation with the successive turns spaced apart axially and having a plurality of cutting teeth formed thereon, means for effecting linear axial movement of said broach and for effecting axial rotation thereof in timed relation to said axial movement, and means for stationarily supporting a work-piece so that it extends laterally toward the broach with said external surface thereof presented to said broach teeth.

12. In a machine for broaching one or more helically disposed serrations on a work-piece, the combination of a broach having a body of strip-like form wound in open generally helical formation with the successive turns spaced apart axially and having a plurality of cutting teeth formed thereon, means for supporting said work-piece so as to project laterally towards said broach body with the broach teeth presented to the work-piece surface, means for effecting linear reciprocation and rotation of said broach and said work-piece relative to each other, and means for effecting relative rotation between said broach and said work-piece during said linear movement including a lead screw drivingly connected to said broach and disposed to be telescopically received into the body of said broach.

AXEL L. NILSSON.